United States Patent
Engelhard et al.

(10) Patent No.: US 9,327,442 B2
(45) Date of Patent: May 3, 2016

(54) DEVICE FOR STERILIZING PLASTIC PARISONS

(75) Inventors: Patrick Engelhard, Elsendorf (DE);
Michael Dahmen, Hamburg (DE);
Oliver Martini, Konolfingen (CH)

(73) Assignee: KRONES, AG, Neutraubling (DE)

( * ) Notice: Subject to any disclaimer, the term of this patent is extended or adjusted under 35 U.S.C. 154(b) by 715 days.

(21) Appl. No.: 13/057,777

(22) PCT Filed: Jul. 31, 2009

(86) PCT No.: PCT/EP2009/059923
§ 371 (c)(1),
(2), (4) Date: Feb. 7, 2011

(87) PCT Pub. No.: WO2010/020530
PCT Pub. Date: Feb. 25, 2010

(65) Prior Publication Data
US 2011/0133370 A1    Jun. 9, 2011

(30) Foreign Application Priority Data
Aug. 18, 2008  (DE) .......................... 10 2008 038 143

(51) Int. Cl.
*B29C 49/46*   (2006.01)
*B29C 49/36*   (2006.01)
*B29C 49/42*   (2006.01)
*B29C 49/12*   (2006.01)

(52) U.S. Cl.
CPC .................. *B29C 49/36* (2013.01); *B29C 49/42* (2013.01); *B29C 49/46* (2013.01); *B29C 49/12* (2013.01); *B29C 49/4205* (2013.01); *B29C 2049/4635* (2013.01); *B29C 2049/4679* (2013.01); *B29C 2049/4682* (2013.01); *B29C 2049/4697* (2013.01); *B29C 2791/005* (2013.01)

(58) Field of Classification Search
None
See application file for complete search history.

(56) References Cited

U.S. PATENT DOCUMENTS 6,351,924 B1    3/2002  Gustafsson et al.
6,562,281 B1 *  5/2003  Marchau et al. .............. 264/532
(Continued)

FOREIGN PATENT DOCUMENTS

CN      1336829     2/2002
CN      101203428   6/2008
(Continued)

OTHER PUBLICATIONS

International Search Report from priority International Application No. PCT/EP2009/059923 mailed Jan. 5, 2010.
(Continued)

*Primary Examiner* — Benjamin Schiffman
(74) *Attorney, Agent, or Firm* — Onello & Mello LLP

(57) ABSTRACT

A device for producing plastic containers may include a heating element for heating plastic parisons, a transport system for transporting the plastic parisons along a pre-defined transport path, and a shaping element arranged along the transport path, downstream of the heating device. The shaping element shapes the plastic parisons to form plastic containers. The device has a sterilization element that applies a free-flowing medium to a wall of the plastic parisons in order to sterilize said wall, the sterilization device being arranged along the transport path of the containers such that the sterilization takes place after the heating process applied to the containers in the heating device and before the end of the shaping process in the shaping element.

14 Claims, 1 Drawing Sheet

(56) References Cited

U.S. PATENT DOCUMENTS

| | | | |
|---|---|---|---|
| 6,692,684 B1 * | 2/2004 | Nantin et al. | 264/521 |
| 6,984,360 B1 * | 1/2006 | Feuilloley et al. | 422/28 |
| 7,141,190 B2 | 11/2006 | Hekal | |
| 7,186,374 B2 * | 3/2007 | Zelina et al. | 422/28 |
| 7,806,680 B2 | 10/2010 | Adriansens et al. | |
| 8,083,512 B2 * | 12/2011 | Adriansens | 425/174.4 |
| 2001/0010145 A1 * | 8/2001 | Tawa et al. | 53/425 |
| 2004/0113328 A1 | 6/2004 | Hekal | |
| 2007/0271871 A1 * | 11/2007 | Spence et al. | 53/201 |
| 2009/0081326 A1 | 3/2009 | Adriansens et al. | |
| 2009/0317506 A1 | 12/2009 | Adriansens | |

FOREIGN PATENT DOCUMENTS

| | | |
|---|---|---|
| CN | 101203428 A | 6/2008 |
| DE | 196 42 987 A1 | 4/1998 |
| DE | 699 00 390 T2 | 6/2002 |
| DE | 698 10 631 T2 | 10/2003 |
| DE | 10 2008 030 156 A1 | 12/2009 |
| EP | 1 086 019 B1 | 3/2001 |
| EP | 1 122 168 A1 | 8/2001 |
| EP | 2 094 312 B1 | 9/2007 |
| FR | 2 887 525 A1 | 12/2006 |
| FR | 2 907 684 A1 | 5/2008 |
| JP | 3-290226 A | 12/1991 |
| WO | 02/42055 A1 | 5/2002 |
| WO | 2006/136498 A1 | 12/2006 |
| WO | 2008/049876 A1 | 5/2008 |

OTHER PUBLICATIONS

Chinese Office Action, dated Feb. 4, 2013, issued in counterpart Chinese Application No. 2009801327963.

China Office Action dated Aug. 11, 2015, issued in corresponding China Application No. 2009801327963.

* cited by examiner

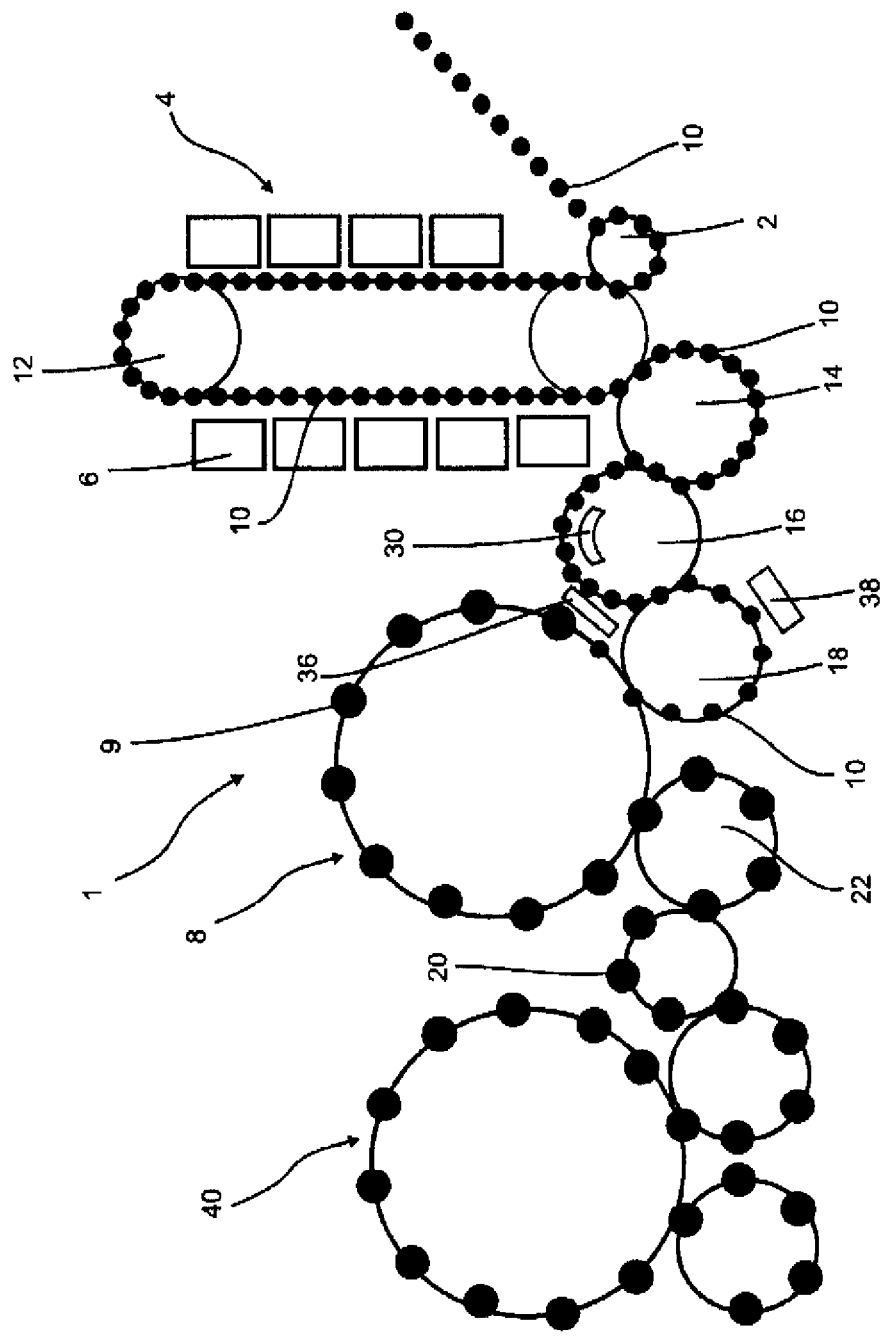

DEVICE FOR STERILIZING PLASTIC PARISONS

CROSS-REFERENCE TO RELATED APPLICATION

This application is filed under 35 U.S.C. 371 as a U.S. national phase application of PCT/EP2009/059923, having an international filing date of Jul. 31, 2009, which claims the benefit of German Patent Application No. 10 2008 038 143.8, having a filing date of Aug. 18, 2008, both of which are hereby incorporated by reference.

TECHNICAL FIELD

The present invention relates to an apparatus for the production of plastics material containers.

BACKGROUND

Apparatus of this type have long been known from the prior art. In this case, plastics material pre-forms are usually first heated and are then expanded to form plastics material containers by means of a shaping device, such as in particular a blow-moulding device. In many applications it is necessary for sterilization of the plastics material containers to be carried out, in particular in the case of sensitive beverages such as for example fruit juices or milk or even in the case of medicines.

It is customary in the prior art for sterilization of the finished blow-moulded containers to be carried out, in which case an inner wall of these containers in particular is sterilized. The drawback of this sterilization of the containers is that they already have a relatively large surface and a large quantity of sterilization agent, such as for example hydrogen peroxide gas, is therefore necessary.

In the prior art a switch from sterilizing the plastics material containers to sterilizing the plastics material pre-forms has therefore started in part, since the latter have a considerably smaller internal surface than the finished blow-moulded containers.

A method and an apparatus for producing sterile packaging containers is known from EP 1 086 019 B1. In this case a suitable method comprises first a pre-heating stage in which the expansible material is heated to an internal surface temperature which exceeds a dew point temperature of a gaseous sterilizing active material but which is below the glazing temperature of the thermoplastic material. In addition, a sterilization stage is provided, in which the sterilizing active material is introduced into the gas phase, as well as a final heating stage, in which the blank is heated to a temperature above the glazing temperature of the blank. In this case therefore the sterilization procedure takes place inside a heating device which heats the pre-forms so that they can subsequently be shaped out by means of blasting air. In this way the temperature of a heating device can be used at the same time to facilitate the sterilization process. On the other hand there is also the drawback, however, that the heating device in question can be permanently damaged by the sterilization agent, such as for example hydrogen peroxide.

A method of producing a sterile container starting from a pre-form is known from EP 0 996 530 B1. In this case a sterilizing product which is capable of being activated by heat is applied to a pre-form and the pre-form is heated in order to activate the sterilizing product at the same time. With this process too there is the drawback, however, that the sterilization is carried out in a heating device which per se is used for the pre-heating of the pre-forms and which can therefore be attacked by the frequently highly corrosive gas.

In addition, various apparatus which sterilize the containers without using gaseous media, for example using electron beams or UV light, are known from the prior art. Apparatus of this type, however, frequently require a very precise screening so that the beams which are very dangerous in part cannot pass to the outside.

It may be desirable therefore to make available an apparatus for producing plastics material containers which permits an inexpensive and efficient sterilization of the containers.

SUMMARY

An apparatus according to the invention for producing plastics material containers has a heating device which heats plastics material pre-forms, as well as a conveying device which conveys the plastics material pre-forms along a pre-set conveying path, and a shaping device which is arranged downstream with respect to the heating device along the conveying path and which shapes the plastics material pre-forms to form plastics material containers.

According to the invention the apparatus has a sterilization device which applies a flowable medium to a wall and, in particular, to an inner wall or an area of this inner wall of the plastics material pre-forms in order to sterilize this inner wall, in which case this sterilization device is arranged with respect to the conveying path of the containers in such a way that the sterilization takes place after the end of the heating procedure of the containers in the heating device and before the end of the shaping procedure in the shaping device.

The apparatus according to the invention ensures on the one hand that the sterilization takes place not only on the finished container but preferably also in a state in which the container is still present as a pre-form. In contrast to the prior art named above, the sterilization takes place after the heating procedure of the pre-forms.

The invention is thus based on the concept that on the one hand use is made of the heat since the preforms themselves have already been heated to a specified heat, but on the other hand the sterilization procedure is not carried out in the heating apparatus itself and so damage to the heating apparatus by the flowable medium is prevented. The flowable medium is, in particular, an aerosol or gaseous medium which is applied to the inner wall of the plastics material pre-forms.

It is preferable, however, for the sterilization apparatus to be situated on the conveying path between the heating device and the shaping device. In this way it is preferable for the sterilization device to be provided in the form of a module which is provided between the heating device and the shaping device. It would also be possible, however, for the sterilization device still to be arranged in the heating device, but on the conveying path downstream of a final heating element of this heating device. In addition, it would be possible for the sterilization device to be placed at the start of the shaping device or to be incorporated in the shaping device.

In this way it would also be possible for example for the expansion procedure also to be carried out with a sterilization medium such as for example hydrogen peroxide gas. In this case for example this sterilization gas could be introduced into the interior of the pre-forms through a hollow stretch rod. In addition, part of the expansion procedure of the containers could be carried out with the sterilization gas. It is preferable, however, for the sterilization of the inner wall of the containers already to have been completed when the plastics material pre-forms reach the shaping device.

It is preferable for a plurality of nozzle devices to be provided which are arranged one behind the other and which can fill a plurality of pre-forms with the sterilization gas simultaneously in this way.

In the case of a further advantageous embodiment the sterilization device is provided on a conveying unit, the latter being provided between the heating device and the shaping device. It is preferable for a conveying device as a whole to have a plurality of individual elements such as conveying star wheels, transfer star wheels and the like, in which case the sterilization device can be arranged on a conveying star wheel or conveying wheel which is separate in this respect.

It is preferable for the sterilization device to have a plurality of nozzle devices which can be introduced into the interior of the plastics material pre-forms and are thus carried along at least locally with the containers along the conveying path thereof.

In the case of a further advantageous embodiment the apparatus has a heating unit which heats the flowable medium before application to the inner wall of the pre-forms. In this case it is possible for the preform first to be brought into the heating device or into a furnace and to be heated to a deformation temperature. The highest temperature of the pre-form is reached in this case. After that, a disinfectant, such as for example hydrogen peroxide, is blown into the pre-form in a sterilization module downstream of the furnace.

In this case the temperature of this gaseous disinfectant is preferably already above the activation level of this gas, in which case use is preferably made of the afore-mentioned heating unit in order to heat the gas. Condensation of the gaseous hydrogen peroxide or disinfecting agent on the inner wall of the pre-form is prevented on account of the high temperature of the preform, since the dew point of the hydrogen peroxide is always lower than the deformation temperature.

In the case of a further advantageous embodiment at least the sterilization device and the shaping device are arranged in a clean room. It would also be possible, however, for the heating device for example also to be arranged in the aforesaid clean room. In addition, a clean room could also embrace a following region of the apparatus, such as for example a closing means for the containers.

In the case of a further advantageous embodiment the apparatus has a further sterilization device which sterilizes an outer wall of the plastics material pre-forms. In this case this further sterilization unit can preferably be arranged in or at the same time downstream of the aforesaid first sterilization unit and can be provided for example in an inlet of the shaping device. This second sterilization unit is preferably likewise a sterilization unit which uses a gaseous medium such as hydrogen peroxide for sterilization. It would also be possible, however, for other sterilization units to be provided and, in particular, those which use electromagnetic radiation for sterilization, such as in particular but not exclusively UV light and/or electron beams.

In the case of a further advantageous embodiment the apparatus has a blow-off unit which blasts the plastics material pre-forms or the inner wall thereof with a gaseous medium, preferably with sterile air, after the sterilization. This blow-off unit ensures that residues of the hydrogen peroxide gas are blown out of the interior of the pre-form substantially completely. On the other hand, however, it can even be intentionally accepted that a certain residue of disinfectant or hydrogen peroxide gas will be conveyed into the shaping unit, so that for example blow-mould halves of these shaping units can also be jointly sterilized.

It is preferable for the flowable medium to be hydrogen peroxide.

The present invention further relates to a method of producing plastics material containers, in which in a first method step plastics material pre-forms are conveyed along a pre-set conveying path. In addition, the plastics material pre-form[s] are heated by means of a heating device while they are conveyed along the conveying path and, after that, the plastics material pre-forms are shaped to form plastics material containers by means of a shaping device, the shaping device being arranged on the conveying path downstream of the heating device. According to the invention a wall and preferably an inner wall of the plastics material preforms is sterilized by means of a flowable medium after the end of the heating procedure and before the end of the shaping procedure. It is preferable for the inner wall to be sterilized after the end of the heating procedure and before the beginning of the shaping procedure.

It is preferable for the sterilization of the inner wall to be carried out by blowing the flowable medium into the plastics material pre-forms.

It is advantageous for the flowable medium to be heated before being blown into the plastics material pre-forms and, in particular, to be heated above its activation temperature before being blown into the plastics material pre-forms. It would also be possible, however, for the flowable medium not to have reached its activation temperature before being blown in and for it to reach this only inside the pre-forms, since the internal temperature of the pre-forms is considerably higher than this activation temperature.

In the case of a further preferred method, while the flowable medium is blown into the containers a temperature of the inner wall of the plastics material pre-forms is higher than its dew point of the flowable medium.

BRIEF DESCRIPTION OF THE DRAWINGS

Further advantages and embodiments may be seen in the accompanying drawing. In the drawing FIG. 1 is a diagrammatic illustration of an apparatus according to the invention.

DETAILED DESCRIPTION

FIG. 1 is a roughly diagrammatic illustration of an apparatus 1 according to the invention.

This apparatus 1 has a supply device 2 which supplies pre-forms 10 in a clock-timed manner or with a precise distribution to a heating device 4. In this case this heating device 4 has a plurality of heating elements 6, which are each arranged outside the preforms 10 along the longitudinal sides of the heating device in each case. The reference number 12 designates a conveying device such as one respective continuous conveying chain which conveys the containers 10 through the heating device 4. The heating device 4 is followed by a conveying device 14 or a sub-unit 14 of the conveying device. This conveying device 14 is a so-called distribution delay star wheel by which for example the distribution between the pre-forms 10 can be altered. The reference letter T designates a conveying path, along which the plastics material pre-forms 10 or subsequently the plastics material containers 20 are conveyed.

This conveying device 14 is followed by a further conveying device 16, sterilization of the preforms 10 being carried out with the aid of a sterilization device 30 in the region of this conveying device 16. This sterilization device 30 is only shown diagrammatically here. It is preferable, however, for elements of this sterilization device 30 to be taken along with the pre-forms 10, i.e. taken along with the pre-forms in the region of the conveying device 16. It is preferable for the sterilization device 30 to have a plurality of filling elements which are capable of being introduced into the openings of the pre-forms in order to act upon the latter with the disinfectant agent. In this case it is preferable for these filling elements to be movable in a longitudinal direction of the plastics material pre-forms 10. It would also be possible, however, for the plastics material pre-forms themselves to move in the longitudinal direction thereof.

The sterilization device 30 or the conveying device 16 respectively is followed by a further conveying device 18 which in this case is again likewise designed in the form of a distribution delay star wheel which can alter the distribution of the plastics material pre-forms. This distribution delay star wheel 18 passes the containers on to a shaping device 8 which in this case has a plurality of blow mould stations 9 which are used for expanding the plastics material pre-forms by means of compressed air to form plastics material containers 20. The conveying device not provided with a reference number as a whole has a plurality of conveying units 12, 14, 16, 18.

The reference number 36 designates a further sterilization device which in particular but not exclusively sterilizes an outer wall of the plastics material pre-forms 10. In addition, a further sterilization device 38 can also be provided in a stationary manner in the region of the conveying device 16.

The shaping device 8 is followed by a further conveying device 22, and the latter ultimately by a filling device 40 which fills the shaped plastics material containers with a medium, such as for example a beverage.

Although not shown, as mentioned above, the apparatus can have a plurality of further sterilization devices which for example are arranged in the heating device, on the shaping device or even downstream of the latter. In addition, the entire apparatus can be situated in a clean room where it is also possible for a further clean room to be provided inside the first-named clean room in the region which starts with the sterilization device 30, in which case a higher degree of cleanness can be preferably present inside this further clean room than in the first-named clean room.

All the features disclosed in the application documents are claimed as being essential to the invention, insofar as they are novel either individually or in combination as compared with the prior art.

What is claimed is:

1. An apparatus for producing plastics material containers having a heating device which heats plastics material pre-forms, a conveying device which conveys the plastics material pre-forms along a pre-set conveying path, and a shaping device which is arranged downstream with respect to the heating device along the conveying path and which shapes the plastics material pre-forms to form plastics material containers, the apparatus comprising:
   a first sterilization device which applies a flowable medium to an inner wall of the plastics material pre-forms in order to sterilize said inner wall, wherein said first sterilization device is arranged with respect to the conveying path of the containers in such a way that the sterilization takes place after the heating procedure of the containers in the heating device ends and before the shaping procedure in the shaping device ends, the first sterilization device having a plurality of nozzle devices arranged one behind the other and configured to fill a plurality of pre-forms simultaneously, wherein the first sterilization device is provided on a conveying unit provided between the heating device and the shaping device, wherein the nozzle devices are positioned relative to an interior of the plastics material pre-forms for outputting the flowable medium from the interior to the inner wall of the plastics material pre-forms, and wherein the nozzle devices are configured to be carried at least locally in movement with the pre-forms along the conveying path; and
   a second sterilization device that sterilizes an outer wall of the preforms, and is stationary relative to the movement of the preforms as they are conveyed along the conveying path.

2. An apparatus according to claim 1, wherein the apparatus has a heating unit which heats the flowable medium before application to said wall of the preforms.

3. An apparatus according to claim 1, wherein at least the sterilization device and the shaping device are arranged in a clean room.

4. An apparatus according to claim 1, wherein said wall comprises an inner wall of the plastics material pre-forms, and wherein the apparatus has a blow-off unit which blasts the plastics material pre-forms with a gaseous medium after the sterilization of the inner wall thereof.

5. An apparatus according to claim 1, wherein the flowable medium is hydrogen peroxide.

6. An apparatus according to claim 1, wherein the plastics material pre-forms themselves are movable in the longitudinal direction.

7. An apparatus for producing plastics material containers comprising:
   a heating device configured to heat plastics material pre-forms;
   a conveying device for conveying the plastics material pre-forms along a pre-set conveying path;
   a shaping device configured to shape the plastics material pre-forms to form plastics material containers, the shaping device being downstream with respect to the heating device along the conveying path; and
   a sterilization device configured to apply a flowable medium to an inner wall of the plastics material pre-forms in order to sterilize said inner wall, said sterilization device being arranged with respect to the conveying path of the containers in such a way that the sterilization takes place after the heating procedure of the containers in the heating device ends and before the shaping procedure in the shaping device ends, the sterilization device having a plurality of nozzle devices arranged one behind the other and configured to fill a plurality of pre-forms simultaneously, the sterilization device being on a conveying unit provided between the heating device and the shaping device, and wherein the apparatus further comprises a sterilization unit configured to sterilize an outer wall of the plastics material pre-forms, wherein the nozzle devices of the sterilization devices are configured to be carried at least locally with the plastics material pre-forms along said conveying path, wherein the conveying device is followed by a further conveying device, wherein sterilization of the pre-forms is carried out with the aid of a sterilization device in a region of said further conveying device, and wherein the further conveying device is designed in the form of a distribution delay star wheel by which the distribution of the plastics material pre-forms is alterable.

8. An apparatus according to claim 7, further comprising a heating unit configured to heat the flowable medium before application to said wall of the preforms.

9. An apparatus according to claim 7, wherein at least the sterilization device and the shaping device are arranged in a clean room.

10. An apparatus according to claim 7, wherein the apparatus further comprises a blow-off unit configured to blast the plastics material pre-forms with a gaseous medium after the sterilization of the inner wall thereof.

11. An apparatus according to claim 7, wherein the flowable medium is hydrogen peroxide.

12. An apparatus according to claim 7, wherein the conveying device is a distribution delay star wheel by which the distribution between the pre-forms is alterable.

13. An apparatus according to claim 7, wherein the distribution delay star wheel passes the containers onto a shaping device which has a plurality of blow mould stations which are used for expanding the plastics material pre-forms by means of a compressed air to form plastics material containers.

14. An apparatus for producing plastics material containers, comprising:
   a heating device which heats plastics material pre-forms;
   a conveying device which conveys the plastics material pre-forms along a pre-set conveying path;
   a shaping device which is arranged downstream with respect to the heating device along the conveying path and which shapes the plastics material pre-forms to form plastics material containers; and
   a sterilization device which applies a flowable medium to a wall of the plastics material pre-forms in order to sterilize said wall, wherein said sterilization device is arranged with respect to the conveying path of the containers in such a way that the sterilization takes place after the heating procedure of the containers in the heating device ends and before the shaping procedure in the shaping device ends, the sterilization device having a plurality of nozzle devices arranged one behind the other and configured to fill a plurality of pre-forms simultaneously and for outputting the flowable medium from an interior to the wall of the plastics material pre-forms, and wherein the sterilization device is provided on a conveying unit provided between the heating device and the shaping device, wherein the conveying device includes a distribution delay star wheel that conveys the preforms from the heating device to the sterilization device, and by which a distribution between the pre-forms is alterable, and wherein the conveying device includes a second distribution delay star wheel that conveys the preforms from the sterilization device to the shaping device, and wherein the nozzle devices are configured to be carried out at least locally with the containers along said conveying path.

\* \* \* \* \*